UNITED STATES PATENT OFFICE.

FREDERICK H. L. C. SACC, OF NEUFCHATEL, SWITZERLAND.

IMPROVEMENT IN PROCESSES OF PRESERVING MEAT.

Specification forming part of Letters Patent No. 169,849, dated November 9, 1875; application filed October 20, 1875.

CASE C.

*To all whom it may concern:*

Be it known that I, F. H. L. C. SACC, of Neufchatel, in the Republic of Switzerland, have invented certain new and useful Improvements in the Preservation of Meats, of which the following is a specification:

My invention, which is the result of uninterrupted research and experiments since 1845, is based upon the employment, instead of direct desiccation, which is tedious, expensive, and impairing the quality of meats, of certain antiseptics to quickly desiccate by the aid of their hygrometric quality.

The substance I use and the *modus operandi* are as follows: In a barrel, or other receptacle, I place, in alternate layers, the meat which is to be preserved, and acetate of soda, ($C_4H_3O_3$, NaO,) in the proportions of about one hundred pounds of the former to about twenty-five pounds of the latter. The thickness of the layers may vary according to circumstances; but I have found that about three inches of the acetate of soda interposed between layers of meat of about one foot of thickness will well answer the purpose.

In the summer, or when the atmospheric temperature is elevated, the action of the acetate of soda will be almost immediate. In the winter I prefer to operate in rooms heated to 20° centigrade. The acetate of soda will thus quickly absorb the water in the meat; but, to complete or perfect its action, I advise that the barrel or vessel may be turned upside down after twenty-four hours, so that the parts which were above may come below. At the expiration of forty-eight hours the process is completed, and the meats may be packed in their own brine, or they may be dried in the open air. If packed in barrels, and the brine not being sufficient to fill the barrel, I recommend brine made by dissolving one part of acetate of soda in three parts of water be added to fill the barrel. The brine separated from the meats, and half evaporated, crystallizes and regenerates from one-half to nine-tenths of the acetate of soda employed.

The mother-liquors constitute an excellent meat-extract, which, as a paste, represents about three per cent. of the weight of meat employed. This extract should be poured upon the preserved meat, to restore to it its flavor of fresh meat.

For use, meats prepared in this manner should be soaked for twenty-four hours, more or less, (according to the size of the pieces,) in tepid water, to which is added five grams of sal-ammoniac ($ClH,NH_3$,) for every litre of water. The sal-ammoniac decomposes the acetate of soda remaining in the meats, forming chloride of sodium and acetate of ammonia.

The meats thus treated are not only well adapted for all the known preparations for which fresh meats are used, but the bones which accompany such meats will yield the essence of excellent soups or bouillons.

Whole carcasses of beef, or of other animal producing butcher's meat, may thus be preserved in a brine of acetate of soda. I have also prepared fish, chickens, ducks, partridges, and other animals entire, taking care only to remove the intestines, bile, &c., which, when left, may impart to the meat a disagreeable taste.

Subjected to the action of the brine the meat loses nearly one-fourth of its weight, and another fourth is lost by drying, which may be effected in suitable heaters, with the exception, however, of certain fishes, such as salmon and trout, which can only be dried in the open air.

Where labor is expensive, or in places where the temperature is not that of summer-heat in temperate zones, I prefer to proceed as follows: I fill the barrel, or other suitable vessel, with the meat proposed to be preserved, and pour into it a solution of twenty-five pounds of acetate of soda in twenty-five pounds of water for every one hundred pounds of meat.

From the foregoing, my method of preservation of meat will be understood to consist in the employment of an antiseptic, which is also a powerful absorbent of water, so that the preservation will be due both to the withdrawal from the meat of the water of its composition and to the anti-putrescent quality of the substance. There are substances other than acetate of soda which have these twofold qualities in a greater or lesser degree; but my researches have led me to abandon all others as being either too costly or unhealthy, or imparting to the meat a bad flavor. The acetate of soda appears to answer the condition of practical utility better than any other, being comparatively cheap, (and it may after use be reclaimed by concentration or evaporation of the brine,) perfectly harmless, and leaves in the meat no unpleasant tase or flavor.

I would observe, however, that the substance may be used as described by me either dry (i. e., alone) or in solution, (i. e., with water,) or it may be used in combination with other solid or liquid bodies without departure from my invention. Thus I have used it in connection with alcohol, glycerine, saltpeter, rock or kitchen salt, and other substances.

Having described my invention, I would state, in conclusion, that I do not claim, broadly, the employment of acetate of soda for the preservation of meat. I am aware that it has before been proposed and essayed to use this substance, but in a manner, however, quite different, and with necessarily different results, from that which I propose, and have above set forth.

What I claim as my invention, therefore, is—

The process of preserving butcher's meat, game, fish, mollusks, &c., in a fresh or uncooked condition by means of acetate of soda, either alone or in connection with other ingredients, applied in the proportions and in the manner substantially as hereinbefore set forth.

In testimony whereof I have hereunto signed my name this 19th day of October, A. D. 1875.

SACC.

Witnesses:
A. POLLOK,
EWELL A. DICK.